United States Patent [19]

Shen

[11] Patent Number: 4,844,164

[45] Date of Patent: Jul. 4, 1989

[54] PROCESS AND COMPOSITION FOR TREATING UNDERGROUND FORMATIONS PENETRATED BY A WELL BOREHOLE

[75] Inventor: Jian-Chyun Shen, Irvine, Calif.

[73] Assignee: Union Oil Company of California, Los Angeles, Calif.

[21] Appl. No.: 199,691

[22] Filed: May 27, 1988

[51] Int. Cl.⁴ .............................................. E21B 33/16
[52] U.S. Cl. .................................. 166/291; 166/292; 166/300
[58] Field of Search ............... 166/270, 291, 292, 293, 166/300; 175/72

[56] References Cited

U.S. PATENT DOCUMENTS

| | | | |
|---|---|---|---|
| 2,848,051 | 8/1958 | Williams | 166/291 |
| 3,091,291 | 5/1963 | Little et al. | 166/292 X |
| 3,242,986 | 3/1966 | Hower | |
| 3,261,400 | 7/1966 | Elfrink | 166/292 |
| 3,285,338 | 11/1966 | Boston | 166/292 X |
| 3,850,248 | 11/1974 | Carney | 166/291 |
| 3,866,683 | 2/1975 | Maly et al. | 166/292 |
| 3,884,302 | 5/1975 | Messenger | 166/291 |
| 3,926,257 | 12/1975 | Marrast et al. | 166/293 |
| 4,102,400 | 7/1978 | Crinkelmeyer et al. | 166/291 X |
| 4,304,298 | 12/1981 | Sutton | 166/293 |
| 4,444,258 | 4/1984 | Kalmar | 166/292 X |
| 4,531,583 | 7/1985 | Revett | 166/291 X |
| 4,588,031 | 5/1986 | Oliver, Jr. et al. | 166/291 |
| 4,718,492 | 1/1988 | Van Laar | 166/295 |

OTHER PUBLICATIONS

"Gas Migration Control Solutions," Halliburton Services, C-1338, 8 pages, undated.

"Cementing Technical Data," Halliburton Services, C-1339, 9 pages, undated.

Primary Examiner—George A. Suchfield
Attorney, Agent, or Firm—Shlomo R. Frieman; G. Wirzbicki

[57] ABSTRACT

An aqueous fluid for treating underground, carbon dioxide-containing formations penetrated by casing regions of a wellbore, prior to the cementing of casings into the wellbore, comprises: (i) water, (ii) an agent which substantially increases (preferably by at least about 50 percent) the solubility of lime in water, and (iii) lime in an amount at least about saturating the water in the fluid. The lime in the treatment fluid reacts with carbon dioxide in penetrated formations to produce insoluble calcium carbonate, which blocks pores in the formations. Insoluble calcium hydroxide, formed by reaction of the lime with the water in the treatment fluid, deposits as an insoluble filter cake on the walls of the borehole where the fluid penetrates formations. The calcium hydroxide filter cake may react with the carbon dioxide to form additional calcium carbonate which helps the filter cake form a tight, impermeable barrier at the borehole. The formation is thus sealed at the borehole and the escape of pressurized fluids from penetrated formations into the borehole is prevented, thereby preventing gas-caused wormholes in the casing cement. If pressurized formations penetrated by the borehole do not contain carbon dioxide, injection of the treatment fluid is preceded by the injection of an aqueous solution containing carbon dioxide or a carbon dioxide precursor, thereby providing the carbon dioxide needed for the formation of the calcium hydroxide and calcium carbonate for sealing off the formations.

69 Claims, 3 Drawing Sheets

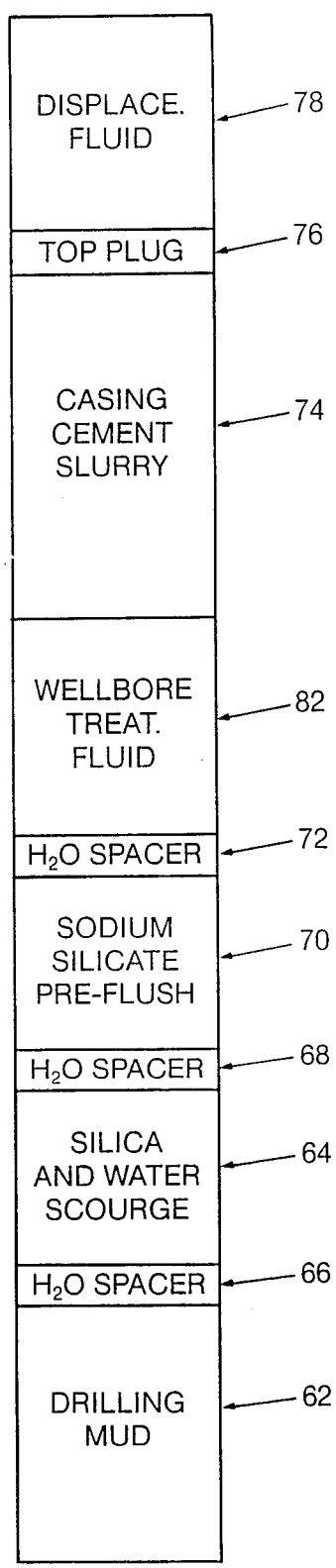
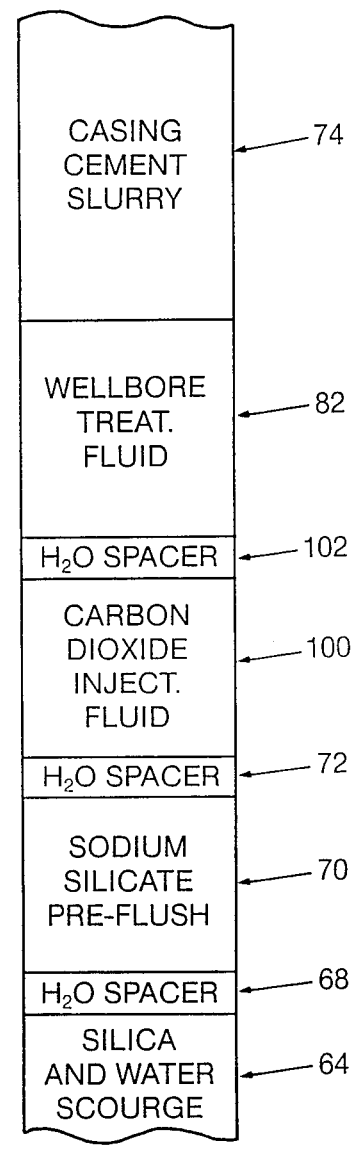
FIG. 3
FIG. 4

PROCESS AND COMPOSITION FOR TREATING UNDERGROUND FORMATIONS PENETRATED BY A WELL BOREHOLE

BACKGROUND OF THE INVENTION

1. Field of the Invention

The present invention relates generally to the cementing of tubular casings into well boreholes and, more particularly, to the pre-cementing treatment of boreholes to improve the integrity of subsequently applied casing cement.

2. Background Discussion

In the drilling of deep wells for the recovery of such fluids as crude oil, natural gas, and geothermal steam or brine, two or more concentric and radially-separated, tubular steel casings are usually cemented into upper, stepped-diameter regions of the borehole. These casings ordinarily extend from ground level to different depths; as an example, the outermost casing may extend to a depth of a hundred or so feet and the innermost casing may extend to a depth of many thousands of feet. In a production (as opposed to an injection) well, after the well casings have been cemented into the wellbore, a fluid-extraction pipe string is hung from the wellhead inside the innermost casing and usually extends at least to the depth thereof. In the case of a so-called "barefoot" well, a lower, uncased portion of the wellbore usually extends to a depth substantially below that of the production pipe string.

A principal objective of cementing casings to substantial depths in wellbores is to seal off earth formations penetrated by the borehole from one another, for example, to seal off higher, non-producing formations from lower formations from which fluid is produced from the well. This sealing off of underground formations from one another along the borehole is desirable for the economic reason of not losing significant amounts of the produced fluid into other formations, and may be a legal requirement to prevent contamination of the fluid—such as potable water—in one formation by fluids—such as crude oil—from another, higher pressure formation. The stepped casing construction, employing several concentrically installed and cemented casings near the earth's surface, provides high strength to protect the production pipe against damage by ground movement and counters the pressure of some penetrated formations. In addition, for geothermal wells and for some heavy oil wells in which the oil has been heated to reduce its viscosity, the added thickness provided by several concentric rings of casings and cement provides good thermal insulation for the production pipe and produced fluid.

To enable tubular casings to be cemented into place, the region of the well borehole which is to receive a casing is bored to a somewhat greater diameter than the casing diameter, thereby providing an annular cementing space between the casing and the borehole. For the same reason, the casing borehole is drilled to a somewhat greater depth than the casing length (vertical height) to provide clearance between the bottom of the casing and the bottom of the borehole. Before being cemented in place, the casing is hung in the oversized borehole with radial and bottom separation between the casing and the borehole. To prevent the formation of cement voids, the casing cement slurry is normally pumped into the borehole through the inside of the casing, the combined pumping and hydrostatic pressure forcing the cement slurry outwardly under the bottom end of the casing and back upwardly through the annular space between the outside of the casing and the borehole wall (and the inside of any next-outer casing) until the cement slurry overflows the casing at the wellhead region.

Following the injection of the cement slurry to fill the annular space around the casing, a mechanical "top plug" is installed which automatically latches into the lower end of the casing to prevent the cement slurry from flowing out of the annular space between the casing and the borehole and back up into the inside of the casing. The inside of the casing is also then typically filled with a displacement fluid to help hold the top plug in place against the hydraulic pressure of the cement outside the casing.

When the cement used to cement an outermost casing in place has sufficiently cured, the borehole for the next-inner casing is drilled downwardly through the inside of the outermost casing and its top plug to the desired depth, and the associated casing is cemented in place in the above-described manner. This well boring and casing installation and cementing process is repeated until all the casings have been cemented into the wellbore.

Detailed processes for such casing cementing are known in the art, as are compositions of the cements used. Regarding these casing cements, hydraulic cements, such as Portland cement, are commonly used. Typical cements for cementing casings are API (American Petroleum Institute) classes "G" or "H," the class "G" cement tending to be used more frequently in western regions of the United States and the class "H" cement tending to be used more frequently in the southern and Gulf regions of the United States. Both the class "G" and "H" cements are described in API Specification No. 10, such Specification being incorporated hereinto, in its entirety, by specific reference.

Difficult problems are, however, often associated with wells in which cemented casings are used. For example, well boreholes frequently penetrate porous and/or unstable underground earth formations into which the casing cement slurry can flow and be lost, thereby resulting in higher cementing costs and the possibility of undesirable cement voids. Other underground regions may be penetrated which absorb water from the casing cement slurry, thereby adversely affecting the cured strength of the cement. To overcome these and other casing cementing problems, particular types of cements have been developed, the slurries of which contain various additives—such as fiberous materials or water loss preventers—which tend to seal porous, weak, and hydroscopic formations and thereby reduce cement slurry and/or water loss into penetrated formations or earth regions.

Another, relatively common problem—and one to which the present invention is principally directed—is caused when a wellbore penetrates underground formations containing such pressurized gases as natural gas, carbon dioxide, hydrogen sulfide, methane, ammonia, or mixtures thereof. When casings are cemented through such formations, the pressurized gases from the formation can penetrate into, and bubble through, the unset cement slurry, thereby causing permanent channels (commonly called "wormholes") as the cement sets up. Any of these wormholes which extend from the borehole to the surface of the cement, or through the cement to the wall of the casing, provide a pathway for the escape of gases—and of other fluids—from penetrated formations to the wellhead region and/or to other, lower pressure formations. The escape of gases and liquids usually starts soon after the casing cementing operation is completed, but may be delayed for some time after completion of the cementing operation if the wormholes are not completely open to the surface or casing when the cement cures.

Gases and other fluids which escape into the wellhead region (through the casing cement or along casing or borehole walls) can, even at best, create inconvenient wellhead working conditions. Depending, however, upon the nature and amount of such gases and/or other fluids which leak from the wellhead region, hazardous wellhead working conditions may be created, and certain escaping liquids, such as brines, can cause excessive corrosion damage to exposed wellhead piping and equipment. Moreover, pollution standards regulating the amount of noxious gases (such as hydrogen sulfide and methane) which may be discharged into the atmosphere and the amount of polluting liquids (such as crude oil and brines) which may be discharged onto the ground, into drainage ditches, or into non-industrial sewers may be exceeded.

In situations where the leakage of fluids at the wellhead cause hazardous working conditions, wellhead pipe and equipment corrosion, and/or environmental pollution, substantial—and usually very costly—measures are necessary to correct the problem. As an illustration, the stopping of serious wellhead fluid leaks from underground formations (after the well casings have been cemented into place) is commonly attempted by boring a number of holes around the wellhead to the depth of the formation suspected of being the source of the wellhead leakage. If more than one underground formation may be the source of the leaking fluid, holes are drilled to the depth of each such formation. A cement slurry is then pressure-injected into the drilled holes to attempt to seal-off the suspected formations from the wellhead region. Such "squeeze-cementing" operation are, for example, disclosed in U.S. Pat. No. 3,242,986 to W. F. Hower. However, squeeze-cementing around a wellhead to stop the leakage of fluids is very costly—often as much as a half million dollars per well.

As an alternative, or in addition, to injecting a cement slurry through holes bored around a leaky wellhead, a downhole region of the casing installation may be perforated, by a perforating gun, in the region of a each suspected formation. A cement slurry is pressure-injected from the inside of the casing outwardly through the casing perforations into the suspected formation in an attempt to seal off the formation from the borehole.

It has, however, frequently been experienced that neither of these injection-cementing operations permanently stop fluid leakage from leaky wellheads. This may be because during the injection process or while setting up, the injected cement becomes contaminated with dirt and/or formation fluids which cause the cement to deteriorate in time. Consequently, follow-on, costly squeeze-cementing operations are sometimes performed—although such re-cementing operations are, as a rule, ineffective at stopping wellhead leaks.

It can, therefore, be appreciated that assuring the integrity of the casing cement against fluid leaks is greatly to be preferred over later attempts to stop wellhead leakage caused by casing cement channels. Toward this end, various casing cement formulations, using special additives, have been used, or proposed, for preventing pressurized formation gases from making wormholes through, or otherwise damaging, casing cement while the cement sets up. The addition of a foaming agent to a casing cement slurry prior to injecting the slurry into a wellbore is, for example, described in U.S. Pat. No. 3,926,257, to J. Marrast, et al. The disclosed foaming agent is intended to cooperate with connate gas escaping from a penetrated formation to create a foam barrier to the migration of the gas through the cement long enough for the cement to set up. Alternatively, U.S. Pat. No. 4,304,298, to D. L. Sutton, discloses the addition to, or the generation of a gas in, a casing cement slurry to prevent connate, pressurized gas from a penetrated formation from penetrating into the cement slurry.

Such special casing cements are, however, often very costly in the large amounts required for cementing casings in many wells. Furthermore, it may be very difficult to determine in advance how much preventive additives are needed for any particular cementing operation. Consequently, much greater amounts of additives than are actually needed must usually be provided in the cement slurry, thereby resulting in unnecessary costs. Still further, since the setting up of cement involves complex mechanisms, it may be very difficult to find additives which effectively prevent damage to the casing cement by formation gases during the cement set up period, but which do not adversely affect the physical properties of the cured cement during its projected lifetime.

INTRODUCTION TO THE INVENTION

The present inventor has importantly discovered a low-cost and effective alternative both to squeeze-cementing and the providing of special casing cements—neither of which may be totally effective in stopping or preventing wellhead leakage of fluids from penetrated formations. It has, in this regard, now been discovered that potentially leak-causing formations which contain carbon dioxide (typically in a mixture of gases, or dissolved in another fluid)—and which are frequently encountered, particularly in geothermal brine well boring operations—are capable of being treated in a manner effectively sealing the formations from the borehole prior to cementing well casings into the borehole. As a result, the penetration of formation fluids into the casing cement are prevented while the cements sets up.

Further in this regard, the present inventor has discovered that the carbon dioxide from penetrated formations can be effectively reacted in a manner which effectively seals the formation against the leakage of all formation fluids into the borehole. Moreover, such formation sealing can be easily and inexpensively accomplished by a pre-cementing, fluid treatment of the wellbore region to be cased and cemented, without the necessity for using special casing cements or cement additives.

This wellbore treatment discovery by the present inventor is particularly important in the drilling of geothermal brine wells. Although natural, underground geothermal brine aquifers often have vast amounts of thermal energy—which can, by existing processes, be used for generating electric power—the extraction, handling, and disposal of the large amounts of brine needed for producing commercial amounts of electric power is generally very costly. These high costs are principally due to the extremely corrosive nature of hot geothermal brine and to the large amounts of scale-forming silica, salts and metals dissolved in the brines. The resulting, severe pipe and equipment corrosion and/or scaling problems have often made it difficult to achieve the economic and competitive production of electric power by the use of geothermal brines—even considering the relatively high costs of natural gas and crude oil used for the more conventional production of electric power. Consequently, cost reductions and savings in any phase of the geothermal brine production, handling and disposal operations are extremely important to the geothermal brine power production industry.

It is, of course, to be understood that the present invention relating to the treatment of well boreholes prior to casing cementing operations to assure the integrity of the cement is not limited to geothermal brine production (or injection) wells. Accordingly, the present invention can be advantageously used in any type of well in which carbon dioxide is present in—or can be introduced from an external source into—pressurized formations through which casings are to be cemented and which may be a source of cement damage during casing cementing operations.

SUMMARY OF THE INVENTION

According to the present invention, there is provided an aqueous fluid (which includes a liquid or a slurry) for treating a borehole penetrating an underground, carbon dioxide-containing formation prior to the cementing of a well casing into the borehole so as to prevent gas-caused damage to the casing cement. The treatment fluid, which may also be considered as a carbon dioxide scavenging fluid, comprises: (i) water, (ii) lime (calcium oxide), and (iii) an agent which substantially increases the solubility of lime in water.

Preferably, the type and amount of solubility-increasing agent increases the solubility of the lime in water by at least about 50 percent. The amount of lime used in the fluid is preferably sufficient to form a saturated, aqueous solution of the lime. However, more preferably, an amount of lime is used which more than saturates or even super saturates the fluid, thereby causing the fluid to be an aqueous slurry.

The lime reacts readily with water in the fluid to form a relatively insoluble calcium hydroxide and to form calcium and hydroxyl ions in solution. These calcium and hydroxyl ions in the treatment fluid, in turn, react with carbon dioxide in a contacted formation to form insoluble calcium carbonate which precipitates in pores of the formation which are penetrated by the treatment fluid. In this manner, carbon dioxide is depleted from contacted regions of the formation borehole and formation pores in this region are plugged by the relatively high-bulk calcium carbonate. The formation pores are further sealed at the borehole by a calcium hydroxide filter cake which accumulates, principally at the borehole surface, by the filtering action of the formation pores into which the treatment fluid penetrates. The calcium hydroxide filter cake may react with any available carbon dioxide gas to form additional calcium carbonate which helps the filter cake form a tight, impermeable barrier around the wellbore. The calcium carbonate in the formation pores and the filter cake (which may also contain calcium carbonate) at the wellbore effectively seal the contacted formation at and around the borehole, thereby protecting the subsequently injected casing cement slurry from damage by formation fluids.

In accordance with a preferred embodiment of the invention, the amount of lime in the treatment fluid is between about 1 and about 30 percent, and is more preferably between about 10 and about 20 percent, by weight of the total amount of water in the fluid. The amounts of lime and solubility-enhancing agent (and the amounts of any other added materials) used in the treatment fluid are preferably such as to cause the fluid to have a viscosity, at 20° C., of no more than about 10 centipoises.

The lime solubility-enhancing agent is preferably selected from the group consisting of polyhydroxyl alcohols, saccharides, polysaccharides, and mixtures thereof, the most preferred solubility-enhancing agent being glycerol (a polyhydroxyl alcohol). When glycerol is used as the solubility-enhancing agent, the preferred amount is between about 5 and about 50 percent, and is more preferably between about 10 and about 20 percent, by weight of the total amount of water in the fluid.

The lime solubility-enhancing agent may be a mixture of glycerol and sugar, in which case, the amount of sugar in the fluid is preferably between about 1 and about 20 percent by weight of the total amount of water in the fluid. The total, combined amount of sugar and glycerol in the fluid is preferably between about 6 and about 50 percent by weight of the total amount of water in the fluid.

Other materials, such as weighting agents, may be added to the scavenging fluid. A preferred weighting agent is a silica flour in an amount up to about 20 percent by weight of the total amount of water in the fluid.

A corresponding process is provided for cementing a tubular well casing into a borehole penetrating an underground, carbon dioxide-containing formation. The cementing process comprises installing a casing in an oversize borehole and contacting the region of the borehole around the outside of the casing with the treatment fluid under pressure. The treatment fluid is then displaced by a casing cement slurry. Preferably the treatment fluid and casing cement injection rates, relative to the amount of the treatment fluid used, are such that the contact time of the treatment fluid is at least about five minutes with all portions of the borehole which the fluid contacts. For economy purposes, and consistent with the mentioned contact time, the volume of the treatment fluid is preferably between about 5 and about 40 percent and more preferably between about 20 and about 40 percent of the volume of the casing cement needed for cementing the casing in the borehole.

In accordance with a variation casing cementing process of the invention, when penetrated formations to be treated do not contain sufficient connate carbon dioxide, injection of the treatment fluid is preceded or followed by the injection into the borehole of a carbon dioxide-supplying fluid, which may comprise an aqueous solution of carbon dioxide or an aqueous solution of a carbon dioxide precursor. Such a carbon dioxide-supplying fluid provides the carbon dioxide needed for reacting with the calcium and hydroxyl ions in the treatment fluid to form calcium carbonate in the formation pores and cause the sealing thereof.

In addition, a process is provided for sealing leaky wellheads by injecting the treatment fluid (preceded, if needed, by the carbon dioxide-supplying fluid) into the formations suspected of being the sources of the leakage. The treatment fluid may be injected into the source formations through holes drilled in the earth around the leaky wellheads and/or through holes made sidewardly through installed and cemented casings.

BRIEF DESCRIPTION OF THE DRAWINGS:

The present invention will be more readily understood by reference to the accompanying drawings, in which:

FIG. 3 is a casing cementing schematic diagram depicting an injection sequence (from bottom to top) of a drilling mud, a first water spacer, a scouring solution, a second water spacer, a sodium silicate preflush solution, a third water spacer, a well bore treatment fluid (in accordance with the present invention), a casing cement slurry, a top plug, and a displacement fluid; and FIG. 4 is a variation casing cementing schematic diagram similar to the schematic drawing of FIG. 3, depicting a variation injection sequence in which a carbon dioxide injection fluid and a water spacer are included in the in the injection sequence just before the wellbore treatment fluid.

Those elements and features which are shown in more than one of the FIGS. are given the same reference number in each FIG. in which they are shown.

DESCRIPTION OF THE PREFERRED EMBODIMENTS

Figure 1:
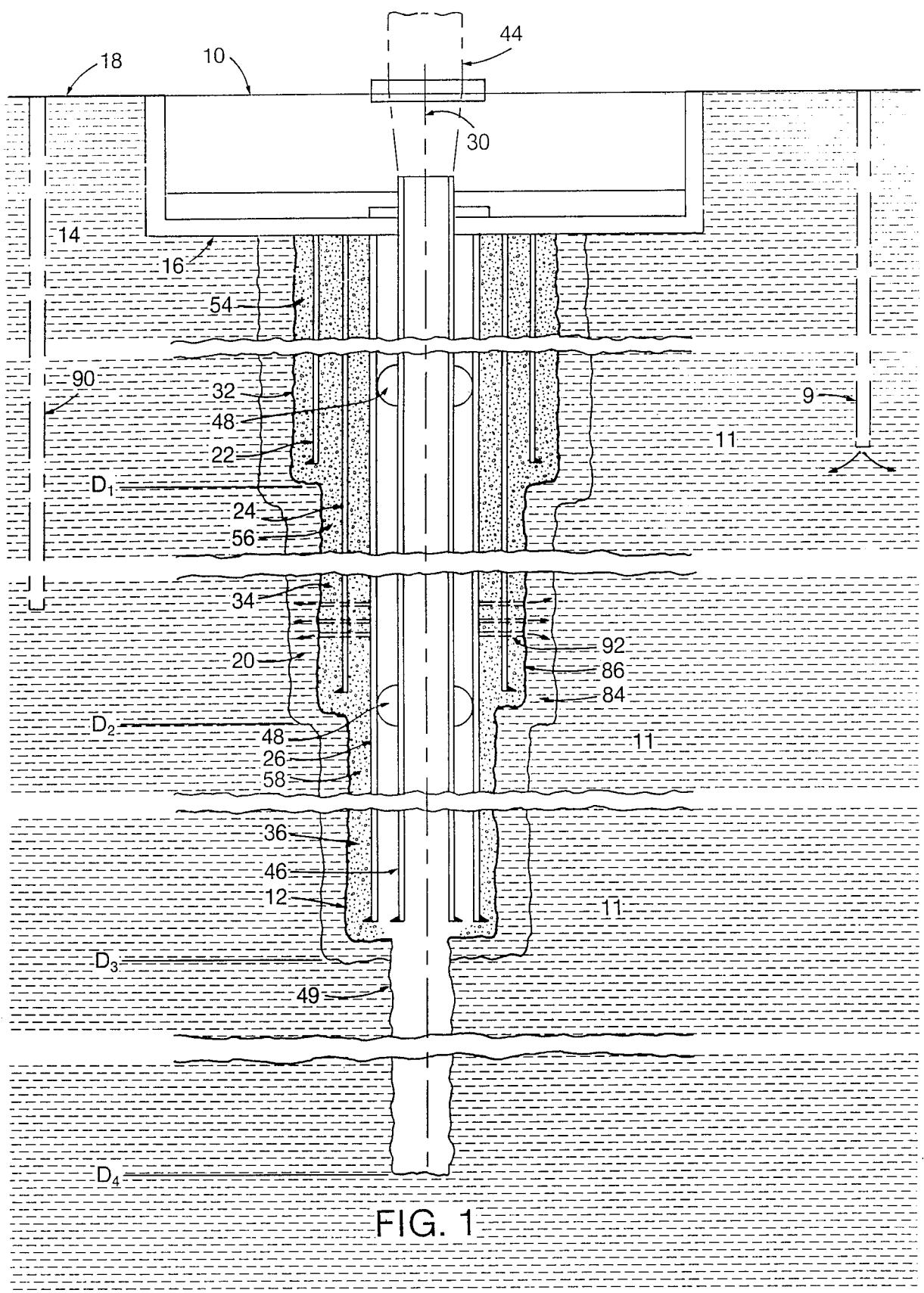
FIG. 1 is a vertical cross sectional schematic diagram of an exemplary "barefoot" well, such as a geothermal brine well, showing three concentric, tubular well casings 22, 24, and 26 cemented into respective upper regions 32, 34, and 36 of a wellbore 12.

Shown in vertical cross section in FIG. 1, is a schematic diagram of an exemplary well 10 bored into subterranean formations 11, in the preparation of which the present wellbore treatment invention may be used to advantage. For purposes of illustrating and describing the present invention, with no limitations being thereby intended or implied, well 10 is presumed to be a deep, geothermal brine production well. It is, however, to be understood that the invention may be used to advantage with other types of wells, including geothermal brine injection wells and oil and gas wells. It is to be further understood that, although FIG. 1 depicts a vertical well, the present invention is also applicable to slant-drilled and horizontally-drilled wells.

Comprising well 10 is a radially-stepped borehole 12 which extends downwardly, with decreasing diameter regions (described below), into ground 14 from a cellar box 16 at ground level 18. A casing installation assembly 20, in upper regions of well 10, comprises respective outer, intermediate, and inner, tubular steel casings 22, 24, and 26. These casings 22, 24, and 26 are concentrically arranged around a central, vertical axis 30 through borehole 12, with the upper ends of the casings in a common horizontal plane at or near the bottom of cellar box 16.

As further depicted in FIG. 1, outer casing 22 is cemented into an oversize region 32 of borehole 12. Borehole region 32 is drilled to a depth, $D_1$, which may, for some wells, be about a hundred feet below ground level 18. Intermediate casing 24 is cemented into a next-lower, oversize borehole region 34 which is bored downwardly through the inside of casing 22. Borehole region 34 may extend to a depth, $D_2$, of between several hundred feet and over a thousand feet. In turn, inner casing 26 is cemented into a third, oversize borehole region 36 which is drilled downwardly through intermediate casing 24. Borehole region 36 is drilled to a depth, $D_3$, which, in some wells, may be several thousand feet. Borehole regions 32, 34, and 36 are drilled to provide several inches of radial clearance and from several inches to several feet of bottom clearance for respective casings 22, 24, and 26.

Suspended through inner casing 26, from a wellhead assembly 44 (shown in phantom lines in FIG. 1), is a geothermal brine production pipe 46. As shown, production pipe 46 extends to the same depth as inner casing 26. A number of radially-extending centralizers 48 are fixed (for example, by welding) to the outside of production pipe 46 to maintain the production pipe centered inside of inner casing 26. A lowermost, uncased ("barefoot") region 49 of wellbore 12 extends substantially beyond the lower end of production pipe 46 to a depth, $D_4$, which may, according to the type of well involved, be many thousands of feet.

Casings 22, 24, and 26 are cemented in place by respective cement regions 54, 56, and 58, each of which extends from the upper end of a given casing to the bottom of the associated borehole region (32, 34, or 36). Thus, in the region of upper casing 22 there are three concentric cement regions (54, 56, and 58) which are separated by casings 22 and 24. In an intermediate region, from the lower end of outer casing 22 to the lower end of casing 24, there are two concentric regions (56 and 58) of cement separated by casing 24. In a lower region, from the lower end of intermediate casing 24 to the lower end of inner casing 26, there is a single region (58) of cement around the inner casing.

Although three casings 22, 24, and 26 are shown installed and cemented (by regions 54, 56, and 58) in respective borehole regions 32, 34, and 36 of exemplary well 10, it is to be appreciated that fewer or more than three of such casings may be installed in some wells. For instance, some oil or gas wells, depending on formations encountered, use only a single casing, corresponding generally to inner casing 26. In any event, all installed casings are cemented in respective borehole regions in essentially the same sequence and manner as is described herein for casings 22, 24, and 26.

Figure 2:
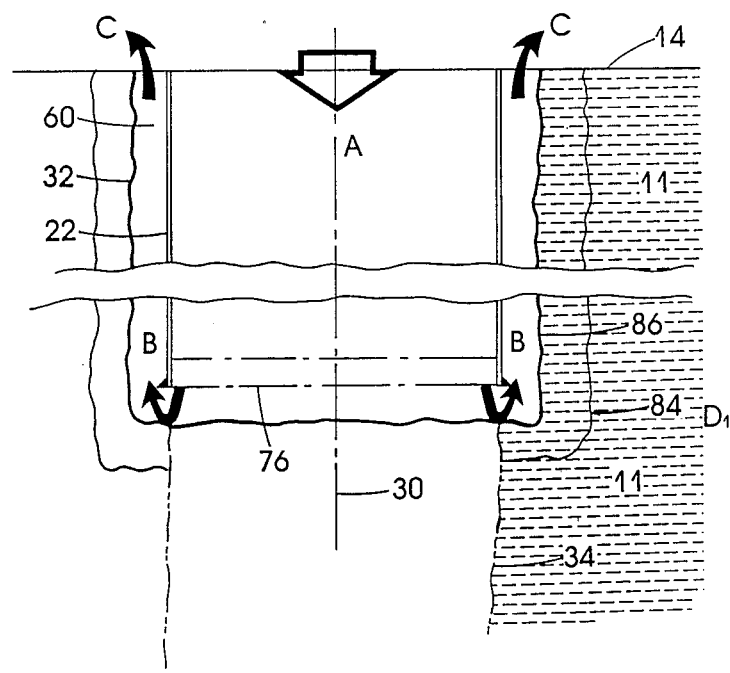
FIG. 2 is a vertical cross sectional diagram of early contruction stages of the well of FIG. 1, showing the installation of the first, outermost tubular steel well casing 22 in initially-drilled region 32 of wellbore 12.

FIG. 2 more specifically illustrates the process by which a typical well casing is installed and cemented in a wellbore, the installation of outer casing 22 of FIG. 1 being shown by way of illustrative example. After upper wellbore region 32 has been bored oversize relative to outer casing 22, the outer casing is suspended (in a conventional manner not shown) in the borehole region so that the lower end of the casing is above the bottom thereof.

Thereafter, as described below in connection with FIG. 3, a cement slurry is ultimately pumped into the inside of casing 22 (flow arrow "A"). As the inside of casing 22 fills with the cement slurry, the slurry flows outwardly under the lower end of casing 22 and upwardly (flow arrows "B") into an annular space 60 between the outside of the casing and the borehole region 32. Pumping of the cement slurry (or a follow-on cement displacement fluid) is ordinarily continued until annular space 60 is completely filled with cement and the cement slurry overflows from the top of the space (flow arrows "C"), thereby assuring the complete filling of the annular space.

More specifically, as schematically depicted by the injection flow diagram of FIG. 3, the cementing process of the preferred embodiment involves the sequential (and generally continuous—or as continuous as possible) injection of several different liquids or slurries. Typically, when the boring of borehole region 32 is completed to depth, $D_1$, at least some liquid-base drilling fluid (drilling mud), used for the drilling operation, remains in the borehole region. This residual drilling mud is identified in the schematic of FIG. 3 by reference number 62, it being understood, however, that the drilling mud is not injected as part of the casing cementing process, but is merely shown in FIG. 3 for illustrative purposes.

After wellbore region 32 has been drilled to its required depth and casing 22 has been suspended therein, a silica and water scourge (identified in the schematic of FIG. 3 by reference number 64) is typically injected into the inside of casing 22 to flush drilling mud 62 out of borehole region 32 through annular space 60. Scourge 64 also cleans the outside of the casing and borehole walls of some of the deposits left by the mud, so that the casing cement will adhere better to the casing and borehole walls and reduce the possibility of fluid channeling along these surfaces after the casing cement slurry has been injected into annular region 60 and has set up. As depicted in FIG. 3, silica and water scourge 64 is typically preceded by a "slug" of water which acts as a liquid spacer or separator (identified in the schematic of FIG. 3 by reference number 66) between drilling mud 62 and the water and silica scourge.

As further depicted in FIG. 3, water and silica scourge 68 is followed by a second water spacer or separator (identified by reference number 68). In some situations, second water spacer 68 is followed by a sodium silicate preflush (indicated by reference number 70) for the purpose of helping to prevent the loss of liquids into penetrated formations 11. Sodium silicate preflush 70 (if used) is followed by a third water spacer or separator (identified by reference number 72).

In casing cementing operations which do not employ the carbon dioxide-reacting treatment fluid of the present invention, a casing cement slurry (identified in the schematic of FIG. 3 by reference number 74) is typically injected immediately after third water spacer 72 (provided that sodium silicate preflush 70 is used, otherwise, the cement slurry is ordinarily injected after second water spacer 68). The amount of cement slurry 74 injected is usually somewhat more than the amount needed to completely fill space 60 between the outside of casing 22 and the surrounding wellbore region 32, as well as the portion of the wellbore region beneath the lower end of the casing. Following the injection of cement slurry 74, a top plug 76 is inserted in casing 22 and is forced to the bottom of the casing by a displacement fluid (identified in the schematic of FIG. 3 by reference number 78). Top plug 76 automatically latches to the lower end of casing 22 to prevent any backflow of cement slurry 74 into inside regions of the casing.

After cement slurry 74, which cements casing 22 in place (and forms cement region 54, FIG. 1) sets up for about eight hours, the next-deeper borehole region 34 (shown in phantom lines in FIG. 2) is bored downwardly through the inside of casing 22 and through top plug 76 and the cement therebeneath, to the required depth, $D_2$. Casing 24 is then suspended in borehole region 34 and is cemented in place by repeating the flushing and cementing operations described above with respect to casing 22. Thereafter, the above-described operations are repeated for borehole region 36 and inner casing 26.

However, as above-described, if any of formations 11 penetrated by borehole regions 32, 34, or 36 contain pressurized gases, the gases will escape from the formations into the borehole regions and penetrate into the cement slurry, thereby frequently causing permanent channels (wormholes) as the gas bubbles travel upwardly through the cement slurry (including upwardly along the cement slurry-borehole interface) to the earth surface or to the casing-cement interface as the slurry is setting up. These wormholes then enable fluids from the penetrated formations to escape continuously to the wellhead after the cement has set up.

The present inventor has, however, discovered that, when any of formations 11 (FIGS. 1 and 2) penetrated by borehole regions 32, 34, and/or 36 contain pressurized gaseous carbon dioxide (or carbon dioxide in a liquid solution), wormholes in or along the casing cement can be effectively prevented by treating the casing borehole, before injecting casing cement slurry 74, with a wellbore treatment fluid (identified in the schematic of FIG. 3 by reference number 82) which reacts with the carbon dioxide to seal off the formations from the borehole. It is to be understood that the carbon dioxide in carbon dioxide-containing formations may be naturally-occurring carbon dioxide or may result from such operations as carbon dioxide flooding of oil-bearing formations for the enhanced recovery of the oil. Preferably, for optimum effectiveness in preventing cement wormholes, treatment fluid 82 is injected immediately preceding cement slurry 74 and without a liquid spacer between it and the cement slurry.

The wellbore treatment fluid of the present invention comprises a mixture of lime (calcium oxide—CaO) and water, and includes a solubility-enhancing agent which substantially increases the solubility of the lime in water so that more lime can be dissolved in the water. Other materials may be added to the treatment fluid in order to assist in the effective contacting of the fluid with formations penetrated by the borehole. For example, a weighting agent, such as silica flour, may be added to increase the density of the fluid for purposes of overcoming formation pressures.

Upon contact with the water in the treatment fluid, the lime reacts to form calcium ions ($Ca^{++}$) and hydroxyl ions ($OH^-$) in the fluid, as well as insoluble calcium hydroxide—$Ca(OH)_2$. In turn, the calcium and hydroxyl ions react very rapidly with any carbon dioxide ($CO_2$) contacted by the fluid to form insoluble calcium carbonate ($CaCO_3$) in the formation pores. In this manner the treatment fluid not only serves to deplete carbon dioxide which might cause wormholes in the casing cement, but, even more importantly, causes the plugging of formation pores in a fluid-penetrated region 84 (FIGS. 1 and 2) of formation 11 around borehole 12. Such plugging of formation pores in region 84 adjacent borehole 12 prevents the escape of all fluids from the formation into the borehole.

Moreover, as the treatment fluid is forced (by injection and hydrostatic pressures) outwardly into pores of the contacted formations, the insoluble calcium hydroxide, formed by contact of the lime with the water in the treatment fluid, tends to filter out at the formation pores, thereby forming a "filter cake" layer 86 (FIGS. 1 and 2) of insoluble material at the borehole wall. In addition, the calcium hydroxide filter cake may react with any available carbon dioxide to form more calcium carbonate which, in part due to its greatly increased volume as compared to the volume of calcium hydroxide, fills voids in filter cake layer 86 and thereby seals the filter cake into an impermeable barrier around the borehole. This filter cake layer 86 helps the calcium carbonate in region 84 to seal off penetrated formations 11 at borehole 12.

A still further, and important, benefit of flushing the borehole with the present treatment fluid prior to the casing cementing operation is that, because of its alkalinity—the treatment fluid typically has a pH between about 11 and about 11.5—the fluid cleans oily contaminants from contacted, exterior surface of the casing and from the borehole walls. This cleaning by the treatment fluid has been found by the present inventor to cause the bonding strength between the subsequently applied casing cement and casing walls to increase by as much as about 50 percent and to substantially improve the bonding strength between the casing cement and the borehole walls, thereby decreasing the likelihood of formation fluids channeling along the casing wall and/or the borehole wall.

The amount of lime used in making the treatment fluid of the present invention is preferably sufficient at least to saturate the water used in the fluid. However, it is even more preferable that the amount of lime used should exceed the amount needed to saturate or even to supersaturate the water in the treatment fluid, the fluid in such case being a slurry of water and insoluble calcium hydroxide (which forms by reaction between the lime and water). More generally, however, the amount of lime in the treatment fluid may be between about 1 and about 30 percent, and, more preferably, between about 10 and about 20 percent, by weight of the water in the fluid.

A type and amount of lime solubility-enhancing agent is used in the treatment fluid which will preferably increase the solubility of lime in water by at least about 50 percent. This assures that when the fluid is forced outwardly from borehole 12 into formations 11, there will be sufficient concentrations of calcium and hydroxyl ions in the fluid to react with carbon dioxide and plug formation pores in region 84 with calcium carbonate. Although many agents which enhance the solubility of lime in water are known, the solubility-enhancing agent is usually selected from the group consisting of polyhydroxyl alcohols, saccharides, poly saccharides, and mixtures thereof. However, the most preferred solubility-enhancement agent is glycerol (a polyhydroxyl alcohol), which not only more than doubles the solubility of lime in water, but also significantly increases the boiling point of the treatment fluid—as is advantageous when treating formations having high temperatures. Moreover, glycerol is readily available at a reasonable cost. It is further preferred—but is not essential—that the glycerol used be of the "technical grade," since impurities in lesser grades of glycerol may adversely affect the performance of the treatment fluid.

The amount of glycerol used in the carbon dioxide scavenging fluid is typically between about 5 and about 50 percent, and is, more preferably, between about 10 and about 20 percent, by weight of the total amount of water used in the fluid.

Sugar can additionally or alternatively be used as a lime solubility-enhancing agent in the borehole treatment fluid. However, because sugar has the disadvantage of carbonizing at a temperature of only about 80° C. (176° F.), it is usually preferred—if high temperatures are expected to be encountered—that sugar not be used, or, if used, then used in combination with glycerol. Preferably, if sugar is used, the amount should be not greater than about 20 percent (for example, between about 1 and about 20 percent) by weight of the water in the scavenging fluid. When used in combination with glycerol, the combined total amount of sugar and glycerol used is preferably between about 6 and about 50 percent by weight of the water in the fluid, with the sugar used still not exceeding about 20 percent by weight of the water used in the fluid.

When the treatment fluid is to be used at depths of more than about 2000 feet and/or to seal high pressure formations, the fluid can benefit by the addition of a weighting (densifying) agent. The preferred weighting agent is a silica flour material in an amount preferably not exceeding about 20 percent by weight of the water in the scavenging fluid—a typical weight range being between about 1 percent and about 20 percent. However, for heavier weights of the treatment fluid, a barite material—in an amount up to about 50 percent by weight of the water in the fluid—can be used.

One preferred composition for the treatment fluid of the present invention is thus: (i) water, (ii) lime in an amount of between about 1 and about 30 percent of weight of the water, (iii) glycerol in an amount of between about 5 and about 50 percent of the weight of the water, (iv) sugar in an amount of up to about 20 percent of the weight of the water—with the combined amount of glycerol and sugar being between about 6 and about 50 percent of the weight of the water, and (v) silica flour in an amount up to about 20 percent of the weight of the water. It is further preferred that the viscosity of the fluid be less than about 10 centipoises at 20° C. (68° F.).

It is recommended that the above-described treatment fluid be mixed "on the fly" at the wellhead, as it is being pumped into the borehole. Inasmuch as the lime will rapidly react with water to produce insoluble calcium hydroxide in the water, if the fluid is mixed and allowed to stand for even a relatively short time, the fluid will become very difficult to pump into borehole 12.

To assure sufficient time for substantial amounts of calcium carbonate to form and plug formation pores, the present inventor has determined that the treatment fluid should preferably contact each part of the borehole into which the fluid is injected for at least about five minutes. It is further preferred that during the fluid-formation contact time, the fluid be in turbulent motion, as is determined by the volume of borehole annular region 60 to be contacted with the fluid and the pumping rates of both the treatment fluid and the casing cement slurry which pushes the fluid through and out of such borehole region.

For a treatment fluid-formation contact time of about five minutes (with turbulent fluid flow), it can generally be expected, depending on the type of formation being treated, that formation region 84 in which the calcium carbonate is formed will be between about one and about two inches thick, and that calcium hydroxide filter cake layer 86 will be about one-eighth inch thick (FIGS. 1 and 2). The providing of a fluid-formation contact time longer than about ten minutes (under turbulent flow conditions) has generally been found not to significantly increase the thicknesses of region 84 and layer 86 over that provided by about a five minute contact time.

The amount of treatment fluid to be used in conjunction with any particular casing cementing operation is a function both of the volume of annular region 60 to be treated by the fluid and the injection rates of the fluid itself and the casing cement slurry which pushes the fluid through such annular region. In general, however, the amount of treatment fluid needed for any casing cementing operation does not need to be as great as the volume of annular region 60, and the treatment fluid volume needed may be between only about one-twentieth and about one-third of the volume of the casing cement slurry needed for the associated cementing operation.

Presently, a typical cost of providing the treatment fluid for a single casing cementing operation is only about $3000, the total per-well cost of the fluid depending upon the number of casings used, but being usually less than about $10,000. Unlike cement squeeze operations employed to stop existing fluid leaks in wellhead regions and which require the costly drilling of injection holes, no special equipment or preparations are needed for using the present treatment, since the scavenging fluid is ordinarily pumped into the borehole by the same pumping equipment used for pumping the other flushing fluids and the casing cement slurry into the borehole.

After the installed casing cement has passed its critical transition time—typically about 8 to 12 hours after injection of the cement slurry—formation gases can no longer cause wormholes in the cement. It is, therefore, not critical that formation pores adjacent the cemented borehole be more permanently sealed by the calcium carbonate deposits and the calcium hydroxide filter cake at the borehole wall. Nevertheless, in the absence of a significant amount of formation water, which, in time, may dissolve the calcium carbonate, the blocking of the penetrated formations at the borehole is expected to last for a substantial length of time, thereby helping to prevent fluid leakage along the borehole-formation interface.

FIRST VARIATION (FIG. 4)

In the above description of the borehole treatment fluid and the process for treating a borehole with the fluid prior to casing cementing operations, the underground formations to be treated by the fluid are presumed to provide all of the carbon dioxide needed to form sufficient calcium carbonate to seal off the formations. However, some borehole-penetrated formations which contain pressurized gases which can cause wormholes in casing cement either may not contain carbon dioxide or may not contain sufficient carbon dioxide to enable adequate formation sealing when contacted with the treatment fluid of the present invention. For example, some penetrated formations which should be sealed may principally contain methane or natural gas and are not, therefore, directly sealable by the present treatment fluid.

Although not directly treatable by the treatment fluid, some carbon dioxide-deficient formations may be treatable by a variation process of the present invention in which carbon dioxide is introduced into the formation from an external source either before or after (although preferably before) the formation is contacted with the treatment fluid. Thus, in a preferred variation formation-sealing process depicted (in part) in the schematic injection diagram of FIG. 4, injection of treatment fluid 82 is preceded by the injection of a carbon dioxide injection fluid (identified in FIG. 4 by reference number 100), which is described below. Preferably, as shown in FIG. 4, carbon dioxide injection fluid 100 is separated from treatment fluid 82 by a water spacer 102.

Carbon dioxide injection fluid 100 may comprise an aqueous liquid which is saturated with carbon dioxide. Alternatively, carbon dioxide injection fluid 100 may be less than saturated in carbon dioxide, or it may comprise a fluid—preferably a liquid—which contains a carbon dioxide precursor which, after injection of the fluid into the formation, generates or produces carbon dioxide in situ. An example of such an alternative carbon dioxide injection fluid 100 is an acidic slurry of crushed calcium carbonate (limestone) or of sodium bicarbonate. The use of a saturated, aqueous solution of carbon dioxide as the carbon dioxide injection fluid is, however, presently preferred because of the relative ease of injecting such a fluid and because better control of such a solution. Moreover, it is anticipated that an aqueous solution of carbon dioxide will be more compatible with underground formations and with the treatment fluid.

According to formation pressures to be overcome, there may be added to the carbon dioxide injection fluid a weighting agent, such as barite. When barite is added to the carbon dioxide injection fluid, there is preferably also added a dispersant, such as a synthetic polymer or a lignin derivative.

A useful carbon dioxide injection fluid may thus comprise: (i) water, (ii) sufficient carbon dioxide to saturate the water, (iii) a weighting agent in an amount of between about 5 percent and about 50 percent by weight of the water, and (iv) a dispersant in the amount of between about 0.1 percent and about 1.0 percent by weight of the water.

Injection of the carbon dioxide injection fluid is at a sufficient pressure to overcome formation pressures and to assure penetration of the fluid into the formations penetrated by the borehole.

SECOND VARIATION

As mentioned above, conventional cement squeezing operations for stopping fluid leakage from a wellhead region after the casings have been cemented into the wellbore, in spite of being very costly, are usually not very effective, at least as a permanent cure. Because of the success achieved by the inexpensive use of the present carbon dioxide scavenging fluid in preventing the penetration of formation fluids into the subsequently-injected casing cement slurry, it is expected that similar benefits can be achieved by the injection of the above-described treatment fluid prior to the injection of the cement slurry in squeeze-cementing operations to solve leaky wellhead problems when formations containing carbon dioxide are the suspected source of the leaking fluids. In such case, the treatment fluid would be injected into small boreholes 90 (shown in phantom lines in FIG. 1) and/or through lateral holes 92 made through one or more casings and their surrounding cement regions.

In the event the formations to be treated do not contain sufficient carbon dioxide for reacting with the treatment fluid, a carbon dioxide-containing fluid (as above-described) may be injected in advance (or following) the injection of the treatment fluid.

EXAMPLES

The present invention is further illustrated by the following Examples which are illustrative of various aspects of the invention and are not intended to limit the scope of the invention as defined by the appended claims.

EXAMPLE 1

Three sand-packed cores, each of which is about one inch in diameter and about three-quarters of an inch thick, are prepared in a one-inch diameter stainless steel holder to simulate porous formations penetrated by a wellbore. The sand-packed cores are contacted for about 10 minutes, at a temperature of about 160° F. and at a pressure of about 100 psig, with a carbon dioxide-reacting treatment fluid having the following composition: (i) water, (ii) lime in the amount of about 5 percent by weight of the water, and (iii) glycerol in the amount of about 10 percent by weight of the water. About a quarter inch thick layer of calcium hydroxide filter cake is deposited by the treatment fluid at the core surface.

The sand-packed cores are next contacted with carbon dioxide at a temperature of about 160° F. and at a pressure of about 120 psig for about 30 minutes and are then examined to determine the carbonate, $(CO_3)^{-2}$, concentration distribution along the depth of the sand cores. The average carbonate distribution is shown in Table 1.

TABLE 1

| Location | Carbonate Dist. |
| --- | --- |
| Filter Cake | 16.4 percent by weight |
| Top Layer | 1.30 percent by weight |
| Middle Layer | 1.03 percent by weight |
| Bottom Layer | 0.24 percent by weight |

The test demonstrates that the carbon dioxide reacts with the calcium hydroxide filter cake and calcium and hydroxyl ions in the treatment fluid to form calcium carbonate in the test samples.

EXAMPLE 2

Two sandstone cores are laboratory tested to evaluate permeability changes due to carbonate formation in the cores. Both sandstone cores are contacted with a carbon dioxide-reacting treatment fluid composed as described above in Example 1, and a layer of calcium hydroxide filter cake about a quarter of an inch thick is formed on the top surface of the cores.

In Test A, the top side of one sandstone core is contacted with carbon dioxide at a temperature of about 160° F. and a pressure of about 120 psig for about 30 minutes to determine the permeability of the filter cake. In Test B, the back side of the second sandstone core is contacted with carbon dioxide under the conditions of Test A to determine the permeability of the sandstone core.

The results of Tests A and B are show in Table 2.

TABLE 2

| Parameter | Test A | Test B |
| --- | --- | --- |
| Water Permeability (millidarcies) | | |
| Before $CO_2$ Inj. | 18.2 | 500 |
| After $CO_2$ Inj. | 0.01 | 78 |
| Carbonate Concentration | | |

TABLE 2-continued

| Parameter | Test A | Test B |
| --- | --- | --- |
| (% by weight) | | |
| Before $CO_2$ Inj. | 0 | 0 |
| After $CO_2$ Inj. | | |
| Top | 0.83 | 2.37 |
| Bottom | 0.53 | 0.63 |

In Test A, the calcium hydroxide filter cake on the sandstone core grows about 50 percent of its original thickness and completely blocks the carbon dioxide passage into the sandstone core. Consequently, the permeability is reduced to 0.01 millidarcy and the carbonate concentration in the core is low. In Test B, the treatment fluid penetrates into the pore voids of the sandstone core and reacts with the carbon dioxide to form calcium carbonate, thereby reducing the core permeability by about 84 percent, with regions of the core close to the filter cake layer having a higher concentration of calcium carbonate in the voids.

These Tests demonstrate that the treatment fluid is effective in reacting with carbon dioxide to seal pores in a sandstone core.

EXAMPLE 3

The compatibility between a carbon dioxide-reacting treatment fluid and a typical casing cement slurry is investigated. The cement slurry comprises: (i) Class II cement, (ii) an amount of fly ash equal to about 22 percent by weight of the cement, (iii) hydrated lime in the amount of about 10 percent by weight of the cement, (iv) "Super Plasticizer" in an amount of about 1 percent by weight of the cement, (v) "Inner Plast" gas expansion agent in the amount of about 1 percent by weight of the cement, and (vi) a mixing liquid. Sand fillers are not added to the cement slurry.

("Super Plasticizer" and "Inner Plast" are the respective commercial names for a high range, water-reducing, anionic surfactant admixture and an aluminum gas generating admixture, both of which are available, for example, from the Southwest Chemicals Company, which is located in El Centro, Calif.)

A total of four cement cubes are made, two from a cement slurry using tap water as the cement mixing liquid and two with the cement slurry using a carbon dioxide-reacting treatment fluid composed as described above in Example 1 as the mixing liquid.

All four cement cubes are cured at 130° F. for 18 hours and the compressive strength of each cube is measured in accordance with the procedures of API Specification 10. The test results are shown in Table 3.

TABLE 3

| Cement Type | Avg. Compressive Strength |
| --- | --- |
| Cement/Tap Water | 945 psig |
| Cement/Scav. Fluid | 955 psig |

The compressive strengths shown in Table 3 demonstrate that the use of the treatment fluid as the cement mixing liquid, in fact, slightly increases the cured strength of the casing cement, as compared to the use of tap water as the mixing liquid, thereby demonstrating that the treatment fluid is compatible with the casing cement.

EXAMPLE 4

The compatibility between a carbon dioxide reacting treatment fluid and a typical drilling mud used for drilling geothermal brine wells is investigated. The drilling fluid is obtained from the Enterprise Geothermal Fluid Company (located in Bakersfield, Calif.), and comprises a mixture of: (i) 350 milliliters of water, (ii) 20 grams of Bentonite (a viscosifier), (iii) 1 gram of "NARLEX D-82" (a high temperature deflocculant), (iv) 1 gram of "CHEMTROL X" (a modified lignite), (v) 1 gram of "LIGCON" (a causticized lignite), (vi) 1 gram of "DFE 104" (a high temperature fluid loss-control agent), (vii) 2 grams of sodium chloride, (viii) 0.1 gram of calcium chloride, and (ix) 20 grams of P-95 (a simulated drill cutting material).

(Bentonite is a generic name for sodium montmonorillonite; "NARLEX D-82" is the trademark of the National Starch and Chemical Corporation, Bridgewater, N.J.; "CHEMTROL X," "LIGCON," and "DFE-104" are trademarks of Milpark, Inc., Houston, Tex.; and P-95 is a generic name for simulated drill cuttings commonly available throughout the oil and gas industry.

To formulate the cement, the water and Bentonite are mixed together and the resulting slurry is aged overnight at room temperature. The remaining materials are then added to the water and Bentonite slurry and the resulting drilling fluid is aged at about 400° F. for about 16 hours.

The carbon dioxide-reacting treatment fluid is composed as described above in Example 1.

A 50/50 mixture of the drilling fluid and the treatment fluid is placed in an atmospheric consistoriest at 160° F. and is stirred for two hours. During this period of time, there is no change of viscosity of the mixture.

Another test is performed at room temperature by slowly adding the treatment fluid into the drilling fluid, the mixture being stirred by hand during the combining process. When the mixture comprises between about 10 percent and about 20 percent treatment fluid, the mixture thickens and becomes barely pourable. However, with the further addition of the treatment fluid, up to about 50 percent of the mixture, the mixture thins out. In a similar test performed in a cement blender, the mixture thickens when the amount of the treatment fluid in the mixture is about 10 percent, the mixture remaining until the amount of treatment fluid in the mixture is increased to about 50 percent.

The tests show that although the treatment fluid and the drilling fluid are compatible at 160° F., they may be incompatible at wellhead temperatures. Therefore, a spacer (for example, water) is recommended between the drilling fluid and the treatment fluid.

EXAMPLE 5

The effect of using a carbon dioxide-reacting treatment fluid flush prior to the casing cementing operation is investigated to determine how the contacting of the treatment fluid with the exterior of a steel casing affects the bonding strength of the cement to the casing.

The casing cement slurry is composed as described above in Example 4 (with tap water being used as the mixing fluid) and the carbon dioxide-reacting treatment fluid is composed as described above in Example 1.

Two cement bonding strength test molds are treated with the treatment fluid for about 10 minutes and are then filled with the casing cement slurry; two control cement molds, which are not treated with the treatment fluid, are also filled with the casing cement slurry. The cement in all four molds is cured for about 24 hours at a temperature of about 190° F. and under a pressure of about 800 psig. The cement-to-casing bonding strength is then measured in accordance with procedures set forth in API Specification No. 10, the results being shown in Table 4.

TABLE 4

| Casing Treatment | Avg. Bonding Strength |
|---|---|
| No Preflush Treat. | 131 psig |
| Preflush Treat. | 167 psig |

The test results show that the bonding strength of the cement to the treated casings is about 30 percent higher than the bonding strength of the cement to the untreated casings.

EXAMPLE 6

A geothermal brine wellbore, about 22 inches in diameter, is bored to a depth of about 270 feet to receive a 16 inch diameter steel casing. The concentration of carbon dioxide in the drilling mud during drilling of the borehole is about 700 parts per million (ppm). The borehole with the casing in place is flushed, prior to cementing of the casing in place, with a carbon dioxide-reacting treatment fluid comprising: (i) water, (ii) lime in an amount equal to about 10 percent by weight of the water in the fluid, and (iii) glycerol in an amount equal to about 10 percent by weight of the water in the fluid. The weight of the treatment fluid is about 9.1 pounds per gallon. A contact time of about 7 minutes is allowed between the treatment fluid and the borehole. The casing is then cemented in place using a typical geothermal surface casing cement.

No gas channeling in the casing cement is observed after the casing is cemented into place.

EXAMPLE 7

A borehole about 14¾ inches in diameter, is drilled to a depth of about 670 feet to receive a 11¾ inch diameter casing. A significant amount of carbon dioxide is encountered at a depth of about 500 feet, and a maximum concentration of carbon dioxide in the drilling mud is about 10,000 ppm during later drilling. Lost circulation of drilling mud also occurs during the drilling.

The borehole is treated, for a contact time of about 7 minutes, with a pre-cementing flush of carbon dioxide-reacting treatment fluid comprising: (i) water, (ii) lime in an amount equal to about 20 percent by weight of the water in the fluid, (iii) glycerol in an amount equal to about 10 percent by the weight of the water in the fluid, and (iv) silica flour in an amount equal to about 5 percent by weight of the water in the fluid. The scavenging fluid has a weight of about 9.4 pounds per gallon.

The casing is then cemented into the borehole using a typical geothermal intermediate casing cement, with 50 percent excess being pumped and 100 percent returned. This indicates that there is no significant loss of the cement. A top squeeze of cement after the primary cementing operation requires only about one half a barrel of cement, indicating little fluid loss and cement falling.

The integrity of the casing cement is good and no carbon dioxide gas bubbles are observed in the cement, thereby demonstrating the effectiveness, in the field, of the carbon dioxide-reacting treatment fluid.

Although there has been described above a preferred embodiment of a carbon dioxide-reacting treatment fluid and processes for treating wellbores before and after casing cementing operations in accordance with the present invention, for the purpose of illustrating the manner in which the invention may be used to advantage, it will be appreciated that the invention is not limited thereto. Accordingly, any and all modifications or variations which may occur to those skilled in the art should be considered to be within the scope and spirit of the invention as defined in the appended claims.

What is claimed is

1. A process for cementing a tubular well casing into an oversize borehole penetrating an underground formation, the process comprising the steps of:
   (a) suspending a tubular casing in the borehole;
   (b) contacting the region of the borehole around the outside of the casing with a pressurized treatment fluid which comprises: (i) water; (ii) a solubility enhancing agent for substantially enhancing the solubility of lime in the water used in the fluid; and (iii) lime and
   (c) injecting casing cement into the region of the borehole around the casing.

2. The casing cementing process as claimed in claim 1, wherein the step of contacting the region of the borehole around the casing with the treatment fluid includes permitting said treatment fluid to have a borehole contact time of at least about five minutes.

3. The casing cementing process as claimed in claim 1, wherein the volume of the treatment fluid is between about 20 and about 40 percent of the volume of the casing cement needed for cementing the casing in the borehole.

4. The casing cementing process as claimed in claim 1, wherein the amount of lime in the treatment fluid exceeds the amount of lime required for saturating the total amount of water in the fluid.

5. The casing cementing process as claimed in claim 1, wherein the amount of lime in the treatment fluid is between about 10 and about 20 percent by weight of the total amount of water in the fluid.

6. The casing cementing process as claimed in claim 1, wherein the solubility enhancing agent in the treatment fluid is selected from the group consisting of polyhydroxyl alcohols, saccharides, polysaccharides, and mixtures thereof.

7. The casing cementing process as claimed in claim 6, wherein the solubility enhancing agent is glycerol.

8. The casing cementing process as claimed in claim 7, wherein the amount of glycerol in the treatment fluid is between about 5 and about 50 percent by weight of the total amount of water in the fluid.

9. The casing cementing process as claimed in claim 7, wherein the amount of glycerol in the treatment fluid is between about 10 and about 20 percent by weight of the total amount of water in the fluid.

10. The casing cementing process as claimed in claim 1, wherein the treatment fluid has a viscosity, at 20° C., of no more than about 10 centipoises.

11. The casing cementing process as claimed in claim 1, wherein the treatment fluid additionally comprises a weighting agent.

12. The casing cementing process as claimed in claim 11, wherein the weighting agent is a silica flour in an amount up to about 20 percent by weight of the water in the fluid.

13. The process of claim 11 wherein the weighting agent comprises up to about 50 percent by weight of the total amount of water in the treatment fluid.

14. The process of claim 11 wherein the weighting agent comprises a barite material.

15. The process of claim 14 wherein the barite material comprises up to about 50 percent by weight of the total amount of water in the treatment fluid.

16. The casing cementing process as claimed in claim 1, wherein the penetrated carbon dioxide-containing formation has pores through which carbon dioxide from the formation penetrates to the borehole and wherein the amount of treatment fluid injected into the region of the borehole around the casing is sufficient to cause said formation pores adjacent the borehole to be at least substantially blocked with calcium carbonate formed by the reaction of the treatment fluid with carbon dioxide from the formation.

17. The process of claim 1 wherein the underground formation is a carbon dioxide-containing formation.

18. The process of claim 1 wherein the step of contacting the region of the borehole around the casing with the treatment fluid includes permitting the treatment fluid to have a borehole contact time of up to about 10 minutes.

19. The process of claim 1 wherein the volume of the treatment fluid is between about 5 and about 40 percent of the volume of the casing cement needed for cementing the casing in the borehole.

20. The process of claim 1 wherein the volume of the treatment fluid is between about 5 and about 33 percent of the volume of the casing cement needed for cementing the casing in the borehole.

21. The process of claim 1 wherein the concentration of lime in the treatment fluid is at least sufficient to about saturate the fluid.

22. The process of claim 1 wherein the amount of lime in the treatment fluid is between about 1 and about 30 percent by weight of the total amount of water in the fluid.

23. The process of claim 1 wherein the solubility enhancing agent is employed in the treatment fluid in a concentration sufficient to increase the solubility of the lime in water by at least about 50 percent.

24. The process of claim 1 wherein the treatment fluid has an alkaline pH.

25. The process of claim 1 wherein the treatment fluid has a pH of about 11 to about 11.5.

26. The process of claim 1 wherein the solubilizing agent comprises sugar.

27. The process of claim 26 wherein the sugar comprises up to about 20 percent by weight of the total amount of water in the treatment fluid.

28. The process of claim 26 wherein the solubilizing agent further comprises glycerol.

29. The process of claim 28 wherein the combined concentration of sugar and glycerol comprises from about 5 to about 50 percent by weight of the total amount of water in the treatment fluid with the concentration of sugar comprising up to about 20 percent by weight of the total amount of water in the treatment fluid.

30. A process for cementing a tubular well casing into an oversize borehole penetrating an underground, carbon dioxide-containing formation which has pores enabling carbon dioxide from the formation to penetrate to the borehole, the process comprising the steps of:
   (a) suspending a casing into the borehole;

(b) contacting a region of the borehole around the casing with a treatment fluid comprising: (i) water; (ii) a solubility enhancing agent for enhancing the solubility of lime in the total amount of water in the fluid by at least about 50 percent, the solubility enhancing agent being selected from the group consisting of polyhydroxyl alcohols, saccharides, polysaccharides, and mixtures thereof; and (iii) lime in an amount at least saturating the fluid; the amount of fluid injected into the region of the borehole around the casing being sufficient to cause formation pores adjacent to the borehole to be at least substantially blocked by calcium carbonate formed by the reaction between the treatment fluid and carbon dioxide from the formation; and (c) displacing the treatment fluid with a casing cement slurry at a rate which permits the fluid to contact the region of the borehole around the casing for at least about 5 minutes.

31. The casing cementing process as claimed in claim 20 wherein the volume of the treatment fluid is between about 5 and about 40 percent of the volume of the casing cement slurry required for cementing the casing in the borehole.

32. The casing cementing process as claimed in claim 30, wherein the amount of lime in the treatment fluid exceeds the amount of lime required to saturate the fluid.

33. The casing cementing process as claimed in claim 30, wherein the amount of lime used in the treatment fluid is between about 10 and about 20 percent by weight of the total amount of water in said fluid.

34. The casing cementing process as claimed is claim 30, wherein the solubility enhancing agent is glycerol and wherein the amount of glycerol in the treatment fluid is between about 10 and about 20 percent by weight of the total amount of water in said fluid.

35. The casing cementing process as claimed in claim 30, wherein the treatment fluid has a viscosity, at 20° C., of no more than about 10 centipoises.

36. The casing cementing process as claimed in claim 30, wherein the treatment fluid additionally comprises a weighting agent in an amount of between about 1 and about 50 percent by weight of the total amount of water in said fluid.

37. A process for cementing a tubular well casing into an oversize borehole penetrating one or more underground formations having pores which enable pressurized formation fluids to penetrate into said borehole, the process comprising the steps of:

(a) suspending a tubular casing in the borehole;
(b) contacting the region of the borehole around the outside of the casing with a pressurized, aqueous liquid containing carbon dioxide, a carbon dioxide precursor, or mixtures thereof;
(c) contacting the region of the borehole around the outside of the casing with a pressurized treatment fluid which reacts with carbon dioxide to form at least one insoluble compound, the treatment fluid comprising: (i) water, (ii) a solubility enhancing agent for substantially enhancing the solubility of lime in the water used in the fluid, and (iii) lime in an amount at least about saturating the fluid; and
(d) injecting a slurry of casing cement into the region of the borehole around the casing.

38. The casing cementing process as claimed in claim 37, wherein said aqueous liquid comprises water saturated with carbon dioxide.

39. The casing cementing process as claimed in claim 37, wherein the aqueous liquid comprises: (i) water, (ii) an amount of carbon dioxide saturating the water, and (iii) a weighting agent.

40. The process of claim 39 wherein the aqueous liquid further comprises a dispersant.

41. The casing cementing process as claimed in claim 37, wherein the step (c) of contacting the region of the borehole with a pressurized treatment fluid is performed in advance of the step (b) of contacting the region of the borehole with a pressurized, aqueous liquid containing carbon dioxide, a carbon dioxide precursor, or mixtures thereof.

42. The process of claim 37 wherein the pressurized, aqueous liquid is sufficiently pressurized to overcome the pressurized formation fluids so that the liquid is capable of penetrating into the formations penetrated by the borehole.

43. A process for cementing a tubular, geothermal well casing into an oversize borehole penetrating one or more underground, pressurized fluid-containing formations having pores which permit pressurized formation fluids to escape into the borehole, the process comprising the steps of:

(a) installing a casing in the borehole;
(b) contacting a region of the borehole around the outside of the casing with a pressurized, aqueous solution of carbon dioxide which comprises: (i) water, (ii) an amount of carbon dioxide saturating the water, (iii) a weighting agent, and (iv) a dispersant, the solution of carbon dioxide being injected at a pressure causing at least some of the solution to penetrate into the pores of the formation adjacent to the borehole;
(c) contacting the region of the borehole around the outside of the casing with a pressurized, carbon dioxide-reacting treatment fluid comprising: (i) water; (ii) glycerol in an amount between about 10 and about 20 percent by weight of the total amount of water in said fluid, (iii) lime in an amount between about 10 and about 20 percent by weight of the total amount of water in the fluid, and (iv) a silica flour in an amount of between about 1 and about 20 percent by weight of the total amount of water in said fluid, the fluid being injected into the formation at a pressure causing at least some of the fluid to penetrate into the pores of the formation in the region of the borehole around the casing; and
(d) displacing the treatment fluid with a casing cement slurry at a rate which permits the treatment fluid to contact the region of the borehole around the casing for at least about 5 minutes.

44. The casing cementing process as claimed in claim 43, wherein the volume of the treatment fluid is between about 20 and about 40 percent of the volume of the casing cement required for cementing the casing in the borehole.

45. The casing cementing process as claimed in claim 43, wherein the treatment fluid has a viscosity, at 20° C., of no more than about 10 centipoises.

46. The casing cementing process as claimed in claim 43, wherein the step (c) of contacting the region of the borehole with a pressurized treatment fluid is performed in advance of the step (b) of contacting the region of the borehole with a pressurized, aqueous solution of carbon dioxide.

47. A process for reducing fluid leakage at a wellhead through or along a well casing installation associated with the wellhead and from one or more underground, carbon dioxide-containing formations penetrated by the associated wellbore, the process comprising, in sequence, the steps of:
  (a) injecting into said one or more penetrated formations a treatment fluid which comprises: (i) water; (ii) a solubility enhancing agent for substantially enhancing the solubility of lime in the water used in the fluid; and (iii) lime in an amount at least about saturating the fluid; and
  (b) injecting a slurry of cement into substantial a same region of said one or more penetrated formations into which the treatment fluid is injected.

48. The wellhead, fluid leakage reduction process as claimed in claim 47, including permitting the treatment fluid to have a contact time of at least about five minutes with said one or more penetrated formations before the cement slurry is injected.

49. The wellhead fluid leakage reduction process as claimed in claim 47, wherein the amount of lime in the treatment fluid exceeds the amount of lime required for saturating the total amount of water in the fluid.

50. The wellhead fluid leakage reduction process as claimed in claim 47, wherein the amount of lime in the treatment fluid is between about 10 and about 20 percent by weight of the total amount of water in the fluid.

51. The wellhead fluid leakage reduction process as claimed in claim 47, wherein the solubility enhancing agent in the treatment fluid is selected from the group consisting of polyhydroxyl alcohols, saccharides, polysaccharides, and mixtures thereof.

52. The wellhead, fluid leakage reduction process as claimed in claim 47, wherein the solubility enhancing agent is glycerol.

53. The wellhead fluid leakage reduction process as claimed in claim 52, wherein the amount of glycerol in the treatment fluid is between about 5 and about 50 percent by weight of the total amount of water in the fluid.

54. The wellhead fluid leakage reduction process as claimed in claim 52, wherein the amount of glycerol in the treatment fluid is between about 10 and about 20 percent by weight of the total amount of water in the fluid.

55. The wellhead fluid leakage reduction process as claimed in claim 47, wherein the treatment fluid has a viscosity, at 20° C., of no more than about 10 centipoises.

56. The wellhead fluid leakage reduction process as claimed in claim 47, wherein the treatment fluid additionally comprises a weighting agent in an amount of between about 1 and about 50 percent by weight of the total amount of water in the fluid.

57. The wellhead fluid leakage reduction process as claimed in claim 56, wherein the weighting agent is a silica flour in an amount between about 1 and about 20 percent by weight of the total amount of water in the fluid.

58. The wellhead fluid leakage reduction process as claimed in claim 47, wherein the one or more penetrated carbon dioxide-containing formations have pores through which fluids from the one or more formations penetrate into the borehole region around the casing installation and wherein the amount of treatment fluid injected into said one or more formations is sufficient to cause said formation pores in the vicinity of said borehole region to be at least substantially blocked with calcium carbonate formed by the reaction of the treatment fluid with carbon dioxide in the formation.

59. The wellhead fluid leakage reduction process as claimed in claim 47, wherein the treatment fluid in injected into said one or more formations through one or more injection boreholes drilled into communication with said one or more formations in the vicinity of said wellhead.

60. The wellhead fluid leakage reduction process as claimed in claim 47, wherein the treatment fluid is injected into said one or more formations through perforations in the casing installation.

61. A process for reducing fluid leakage at a wellhead through or along a well casing installation associated with the wellhead and from one or more underground formations penetrated by the associated wellbore, the process comprising the steps of:
  (a) injecting into said one or more penetrated formations an aqueous liquid containing carbon dioxide, a carbon dioxide precursor, or a mixture thereof;
  (b) injecting into said one or more penetrated formations a treatment fluid which comprises: (i) water; (ii) a solubility enhancing agent for substantially enhancing the solubility of lime in the water used in the fluid; and (iii) lime in an amount at least about saturating the fluid; and
  (c) injecting a slurry of cement into substantial a same region of said one or more penetrated formations into which the treatment fluid is injected.

62. The wellhead fluid leakage reduction process as claimed in claim 61, wherein said aqueous liquid comprises water saturated with carbon dioxide.

63. The wellhead fluid leakage reduction process as claimed in claim 61, wherein said aqueous solution comprises: (i) water, (ii) an amount of carbon dioxide saturating the water, (iii) a weighting agent, and (iv) a dispersant.

64. The wellhead fluid leakage reduction process as claimed in claim 61, wherein the treatment fluid in injected into said one or more formations through one or more injection boreholes drilled into communication with said one or more formations in the vicinity of said wellhead.

65. The wellhead fluid leakage reduction process as claimed in claim 61, wherein the treatment fluid is injected into said one or more formations through perforations in the casing installation.

66. The wellhead fluid leakage reduction process as claimed in claim 61, wherein the step (b) of injecting a treatment fluid is performed in advance of the step (a) of injecting an aqueous liquid containing carbon dioxide, a carbon dioxide precursor, or a mixture thereof.

67. A process for reducing fluid leakage at a wellhead through or along a well casing installation associated with the wellhead and from one or more underground formations penetrated by the associated wellbore, the process comprising the steps of:
  (a) injecting into said one or more penetrated formations an aqueous solution of carbon dioxide which comprises: (i) water, (ii) an amount of water saturating the water, (iii) a weighting agent, and (iv) a dispersant, the solution of carbon dioxide being injected at a pressure causing some of the solution to penetrate into the pores of the formation adjacent to the borehole;
  (b) injecting into said one or more penetrated formations a carbon dioxide-reacting treatment fluid comprising: (i) water; (ii) glycerol in an amount between about 10 and about 20 percent by weight of the total amount of water in said fluid, (iii) lime in an amount between about 10 and about 20 percent by weight of the total amount of water in the fluid, and (iv) a silica flour in an amount of between about 1 and about 20 percent by weight of the total amount of water in said fluid; and (c) injecting a slurry of cement into substantial a same region of said one or more penetrated formations into which the treatment fluid is injected, the cement slurry being injected at a rate which permits the treatment fluid to contact said one or more formations for at least about 5 minutes.

68. The wellhead fluid leakage reduction process as claimed in claim 67, wherein the treatment fluid has a viscosity, at 20° C., of no more than about 10 centipoises.

69. The wellhead fluid leakage reductions process as claimed in claim 67, wherein the step (b) of injecting a treatment fluid is performed in advance of the step (a) of injecting an aqueous solution of carbon dioxide.

* * * * *

UNITED STATES PATENT AND TRADEMARK OFFICE
CERTIFICATE OF CORRECTION

PATENT NO. : 4,844,164
DATED : July 4, 1989
INVENTOR(S) : Jian-Chyun Shen

It is certified that error appears in the above-identified patent and that said Letters Patent is hereby corrected as shown below:

Abstract, last line, after "." insert -- Corresponding processes are provided for cementing casings into wellbores and for reducing fluid leakage through or past existing casing installations. --

Claim 31, line 1, after "claim" insert -- 30 --.

Signed and Sealed this

Twenty-third Day of October, 1990

*Attest:*

HARRY F. MANBECK, JR.

*Attesting Officer*     *Commissioner of Patents and Trademarks*